S. L. BATES.
CHOPPING KNIFE.
APPLICATION FILED APR. 14, 1908.
935,576.
Patented Sept. 28, 1909.
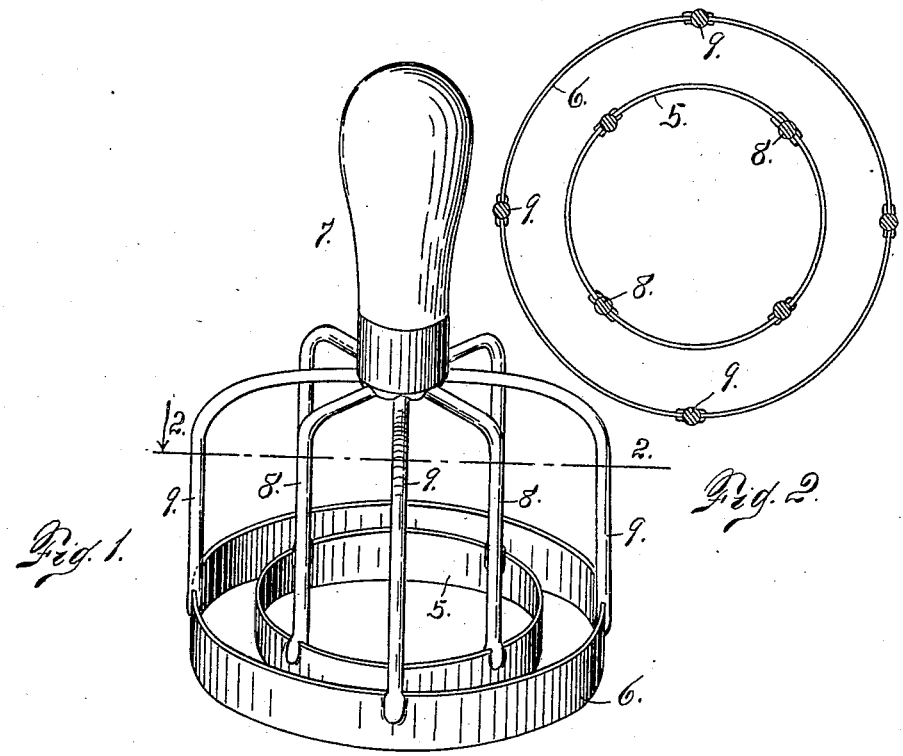
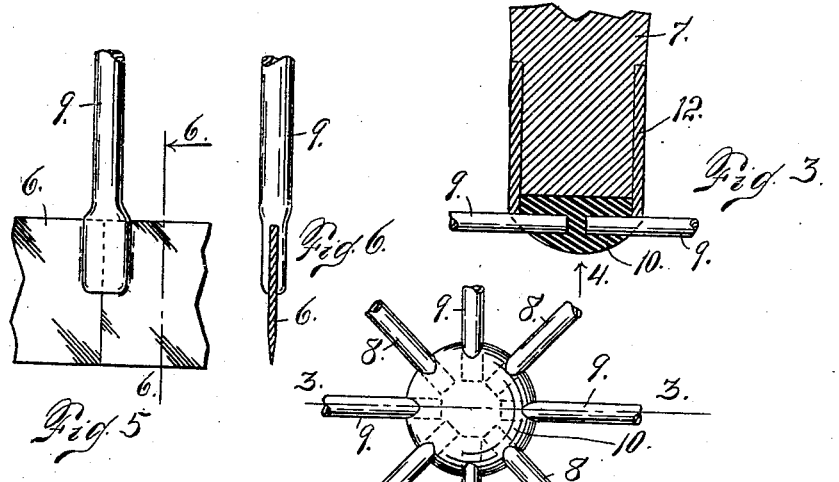
Witnesses
Otto E. Hoddick
Dena Nelson
Inventor
S. L. Bates
By
Attorney

UNITED STATES PATENT OFFICE.

SAMUEL LEE BATES, OF DENVER, COLORADO, ASSIGNOR OF ONE-HALF TO JOHN E. HEWITT, OF DENVER, COLORADO.

CHOPPING-KNIFE.

935,576.   Specification of Letters Patent.   Patented Sept. 28, 1909.

Application filed April 14, 1908. Serial No. 426,956.

*To all whom it may concern:*

Be it known that I, SAMUEL LEE BATES, a citizen of the United States, residing in the city and county of Denver and State of Colorado, have invented certain new and useful Improvements in Chopping-Knives; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in chopping knives in which a number of annularly arranged blades are employed, the same being rigidly attached to a handle by inner and outer vertically disposed parallel arms. In my improved construction two blades only are illustrated. It is evident, however, that more than two may be employed if desired.

Having briefly outlined my improved construction I will proceed to describe the same in detail reference being made to the accompanying drawing in which is illustrated an embodiment thereof.

In this drawing, Figure 1 is a perspective view of my improved chopping knife. Fig. 2 is a horizontal section taken through the knife-supporting arms between the handle and the blades looking downwardly. This section is indicated by the section line 2—2 Fig. 1. Fig. 3 is a fragmentary vertical section taken through the handle, illustrating the manner of connecting the knife-supporting arms therewith. This section is indicated by the line 3—3 Fig. 4. Fig. 4 is a fragmentary top plan view of the device showing the handle and a portion only of the knife-supporting arms. Fig. 5 is a fragmentary elevation illustrating one of the knives and one of its supporting arms, the parts being shown on a larger scale. Fig. 6 is a section taken on the line 6—6 Fig. 5 viewed in the direction of the arrow.

The same reference characters indicate the same parts in all the views.

Let the numerals 5 and 6 designate inner and outer circular blades, annularly arranged and respectively connected with a handle 7 by two series of arms designated 8 and 9 respectively. The lower extremity of each of the arms 8 and 9, is slotted to straddle the upper edge of the blade with which it is connected, these slotted extremities of the arms being connected with the blades by soldering or in any other suitable manner. The outer arms 9 extend upwardly vertically from the blade 6, being finally bent inwardly and secured to the lower extremity of the handle by means of solder 10 or in any other suitable manner. As shown in the drawing the solder 10 is anchored in the lower part of a ferrule 12 which is applied to the lower extremity of the handle, the ferrule projecting a short distance below the handle, thus giving an opportunity to securely anchor the solder where it is applied to the inner extremities of the arms. This solder 10 is also applied to the upper and inner extremities of the arms 8, the same having also lower parallel portions while their upper portions are bent inwardly approximately at right angles to their lower portions.

The blades 5 and 6 have their lower edges sharpened (see Fig. 6) in order that they may properly cut the material acted upon.

From the foregoing description the use of my improved chopping knife will be readily understood and need not be further described in detail.

Having thus described my invention, what I claim is:

A chopping knife comprising a handle, inner and outer annularly arranged, relatively narrow blades, the centers of the circles of the said blades being coincident with the axis of the handle, and two sets of arms, the said sets having their lower extremities bifurcated to receive the upper edges of the said blades, to which the arms are secured, the individual arms of the two sets of blades being radially arranged in staggered relation, while their upper extremities are attached to the handle in a common zone at points equidistantly arranged, the arms extending vertically for a distance above the blades and being bent above their vertical portions to form suitable angles substantially as described.

In testimony whereof I affix my signature in presence of two witnesses.

SAMUEL LEE BATES.

Witnesses:
 A. J. O'BRIEN,
 JOHN E. HEWITT.